United States Patent [19]

Piestert et al.

[11] 4,285,755

[45] Aug. 25, 1981

[54] ADHESIVE COMPOSITION AND METHOD

[75] Inventors: Gerhardt Piestert, Oberursel; Heinz G. Gilch, Leimen, both of Fed. Rep. of Germany

[73] Assignee: USM Corporation, Farmington, Conn.

[21] Appl. No.: 75,904

[22] Filed: Sep. 17, 1979

Related U.S. Application Data

[63] Continuation of Ser. No. 885,080, Mar. 9, 1978, abandoned.

[30] Foreign Application Priority Data

Mar. 17, 1977 [DE] Fed. Rep. of Germany ....... 2711748

[51] Int. Cl.³ .......................... B29C 19/00; C09J 5/00
[52] U.S. Cl. .................................. 156/294; 156/314;
156/332; 156/307.3; 156/307.7; 427/302;
427/409; 428/463; 526/292; 526/328; 156/310
[58] Field of Search ............ 156/332, 314, 294, 307.3,
156/310, 307.7; 427/302, 409; 428/463;
260/DIG. 28; 526/292, 328

[56] References Cited

U.S. PATENT DOCUMENTS

| 3,180,777 | 4/1965 | Karo | 156/314 |
|---|---|---|---|
| 3,419,512 | 12/1968 | Lees et al. | 156/332 |
| 3,479,246 | 11/1969 | Stapleton | 156/332 |
| 3,837,963 | 9/1974 | Frauenglass et al. | 156/310 |
| 3,855,040 | 12/1974 | Malofsky | 156/332 |

*Primary Examiner*—John J. Gallagher
*Attorney, Agent, or Firm*—John P. Morley; Benjamin C. Pollard

[57] ABSTRACT

Adhesive composition based on acrylate monomers and a peroxide, together with selected halogenated aliphatic acids, which is storage stable and can be used as an anaerobic adhesive composition and a method of bonding by use of that adhesive to quickly form adhesive bonds to steel, copper, zinc and brass without use of a primer, which bonds do not lead to significant corrosion of the metals.

21 Claims, No Drawings

ADHESIVE COMPOSITION AND METHOD

This is a continuation, of application Ser. No. 885,080, filed Mar. 9, 1978, now abandoned.

FIELD OF THE INVENTION

This invention is concerned with improvements in or relating to anaerobic curing adhesive compositions and methods of bonding with such compositions.

BACKGROUND OF THE INVENTION

By anaerobic curing adhesive compositions we means compositions which contain ethylenically unsaturated monomer which is stable for long periods when stored in presence of air or oxygen, but which polymerises to provide adhesive bonds rapidly in absence of air or oxygen particularly in the presence of certain metals. The invention relates especially to a method of locking nuts and bolts and the like by means of anaerobic adhesive compositions, and to selected adhesive compositions which may be used in such method.

It is known that certain ethylenically unsaturated compounds, including diacrylate esters of glycols (for example those glycols having one or more oxygen atoms in the chain) can be caused to polymerise by excluding them from contact with oxygen, and that polymerisation may be inhibited by maintaining the compounds in intimate contact with gaseous oxygen. It is commonly believed that the curing of anaerobic adhesives occurs by free radical polymerisation of ethylenically unsaturated monomers in the composition to provide polymer chains. It is known to promote polymerisation of these compounds by use of peroxides, and that the presence of hydroquinone enhances the shelf life of such products.

The balance between shelf life, polymerization speed and the required strength of adhesive bonds formed with anaerobic adhesive compositions has posed problems, and many proposals have been made to solve these problems. For example, in U.K. Pat. No. 1,090,753 it is proposed to employ selected peroxides in combination with an organic tertiary amine in an anaerobic composition including selected diacrylates, in order to provide a balance between shelf life and polymerisation speed of the composition. It has also been proposed to employ a hydroperoxide in conjunction with a tertiary amine. We have observed that anaerobic adhesive compositions containing a peroxide and an organic tertiary amine tend to have in most cases an acceptable shelf life but a less acceptable speed of polymerization to full bond strength.

It has also been proposed to include in anaerobic curing compositions an accelerator, e.g. an acid or a salt capable of dissociating in water to enhance the commencement of the polymerization. U.K. Pat. No. 1,161,661 is concerned with a nut locking adhesive composition based on selected acrylate monomers intended to provide satisfactory bonds not only on ferrous metal surfaces but also on surfaces normally less susceptible of adhesive bonding by anaerobic adhesive compositions, e.g. cadmium.

It has also been proposed to include in anaerobic curing compositions containing acrylate ester monomers a peroxy polymerization initiator, peroxide, an acidic substance and a substituted thiorea. U.S. Pat. No. 3,970,505 is concerned with an adhesive with ability to cure through relatively large gaps. It is indicated that the combination of acidic substance and substituted thiourea confers certain special and desirable properties on the adhesive. However, the substituted thiourea is so reactive with other components of the composition that it must be kept separate therefrom until use. In this case, not only are special substituted thioureas expensive to obtain, but also the adhesives must be stored and used as two part compositions.

We have found that anaerobic adhesives which include the more commonly available acids tend to be unsatisfactory for use on ferrous metals, because there is a tendency for the metal subsequently to become corroded as a result of corrosion-propagating action of residual acid remaining in the bond line after completion of the adhesive bond. Furthermore, we have found that a rapid curing of these adhesive compositions is more likely to be achieved by use of stronger acids, which in turn one would expect to lead to more severe corrosion problems. Naturally, corrosion is an undesirable result in view of the cost of replacing affected parts, and adhesives which actively encourage corrosion are regarded as undesirable.

SUMMARY OF THE INVENTION

It is an object of the present invention to provide an anaerobic adhesive composition which has a desirable combination of storage stability, setting time and bond strength, and a method of bonding metal parts without significant corrosion of the metal parts.

To this end and in accordance with a feature of the present invention we have provided an adhesive composition based on acrylate monomers and a peroxide, together with selected halogenated aliphatic acids, which is storage stable and can be used as an anaerobic adhesive composition and a method of bonding by use of that adhesive to quickly form adhesive bonds to steel, copper, zinc and brass without use of a primer, which bonds do not lead to significant corrosion of the metals.

DETAILED DESCRIPTION OF THE EMBODIMENT

The present invention provides a novel adhesive and method of bonding surfaces by use of that adhesive in which the adhesive composition comprises a polymerizable acrylic monomer and a peroxide together with a halogenated aliphatic monocarboxylic acid having the general formula:

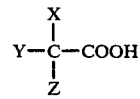

in which
(i) each of X, Y and Z is Cl or Br or
(ii) Z is H or R (where R is a methyl or ethyl group) and each of X and Y is Cl or Br or
(iii) each of Y and Z is H or R and X is Cl.

The adhesive composition is effective to form adhesive bonds quickly when applied to a clean metal surface which has not been treated with a substituted thiourea primer.

Acrylic monomers suitable for use in an adhesive composition for use in a method according to the invention are ethylenically unsaturated acrylic and substituted acrylic monomers, and partial polymers (and mixtures thereof) including especially methacrylates. For high quality adhesives it is preferable to employ materials having two ethylenically unsaturated bonds in end groups of their molecular chains; we believe that these materials offer not only a possibility of linear addition polymerization, but also a possibility of a degree of crosslinking between chains of polymeric material. We believe this latter effect is of importance in view of the cohesive strength and solvent resistance which crosslinking may confer on the adhesive bond when formed. In general, we prefer to use materials corresponding to the general formula:

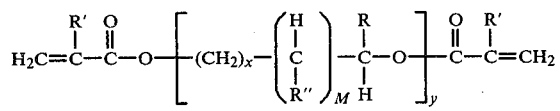

where R is —H, —CH$_3$, —C$_2$H$_5$, —CH$_2$OH or

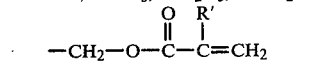

R' is —H, —Cl, —CH$_3$ or —C$_2$H$_5$

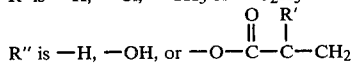

and n is 0 or 1, x is an integer from 1 to 8 and y is an integer from 1 to 20.

For screw fastening adhesives, we prefer to employ ethylene glycol dimethacrylate to provide at least a major portion of the acrylate monomer. However, other monomers according to the above general formula may be used instead of, or in addition to, the preferred monomer in accordance with the bond strength required to the adhesive. Typical examples include tetraethylene glycol dimethacrylate, triethylene glycol dimethacrylate, diethylene glycol dimethacrylate, and esters of acrylic acid with tetraethylene glycol, triethylene glycol, diethylene glycol and ethylene glycol. As mentioned above, various acrylic or substituted acrylic monomers may be employed in the composition, but we prefer to employ ethylene glycol dimethacrylate as the principle polymerizable component of screw locking adhesives.

We have found that adhesive compositions which include ethylene glycol dimethacrylate yield good bond strengths on steel in a comparatively short time. Indeed, the bond strengths achieved may be greater than required of adhesives for use in some nut locking applications (e.g. where the screw is to be repeatedly adjusted, or re-used). The bonding strength of these adhesives may be reduced to a controllable extent by inclusion in the composition of monoethylenically unsaturated monomers for example 2-hydroxy ethyl acrylate, and decylmethacrylate. It is also possible to modify adhesive flow characteristics of the composition by presence of plasticizing materials for example butyl benzylphthalate, or by presence of suitable quantities of polymeric thickening agents for example polymethacrylates, polyesters, polyvinylacetate, polyacrylonitrile butadiene, and polyvinylchloride. Other additives, including coloring matters and fillers may be included if desired, due regard being paid to their effects, if any, on desirable properties of the composition.

The selected halogenated aliphatic acids are chosen for adhesive compositions for use in a method according to the invention with a view to ensuring good storage stability of the adhesive composition, and fast reaction of the composition to provide a polymeric mass adherent to certain metallic substrates when cured without encouraging corrosion of the substrate. Preferably the composition is such that thin layers on the metallic substrates also cure even when exposed to air to provide a polymeric mass as a thin coating on the substrate. We have found that mild steel screws bonded to nuts with compositions containing the preferred acids do not exhibit significant corrosion. Halogenated aliphatic carboxylic acids satisfactory for use in an adhesive composition for use in a method according to the present invention satisfy the general formula given above. Preferred acids have a dissociation constant greater than $10^{-3}$ and may comprise for example one or more of dichloroacetic acid, trichloroacetic acid, tribromoacetic acid, monochloroacetic acid, dibromo acetic acid, $\alpha.\alpha$dichloropropionic acid and $\alpha.\alpha$dibromopropionic acid. Of these acids, a preferred group comprises dichloroacetic acid, trichloroacetic acid and tribromoacetic acid. However, we prefer to use trichloroacetic acid, which has a dissociation constant of $2.1 \times 10^{-1}$. By way of contrast, we have noted that use of hydrochloric acid, sulphuric acid, or trifluoroacetic acid, instead of these halogenated aliphatic carboxylic acids in anaerobic adhesives tends to lead not only to a rapid initiation of polymerization of the acrylic monomer when air or oxygen is excluded from a steel to steel bond, but also promotes significant corrosion of steel surfaces in steel to steel adhesive bonds. Also, we have observed that use of acetic acid, trisiodoacetic acid or acrylic acid instead of the specified halogenated aliphatic carboxylic acids in otherwise similar compositions tends to result in comparatively stable compositions which do not start to polymerize well or at all when required for use in making steel to steel adhesive bonds.

Although the mechanism by which the selected acids operate to provide the desired beneficial results is not fully understood, we believe it may be explained in the following way. We believe that the selected halogenated aliphatic carboxylic acids take part in commencing the process of polymerizing the acrylate monomer. We believe that the acid undergoes chemical reaction with a ferrous substrate to yield ferrous ions which in turn interact with the peroxide to generate free radicals, and that initiation of a polymer chain is brought about by interaction of a molecule of the acrylic monomer and a free radical to provide a polymer radical capable of chain propagation. We believe this mechanism, using a steel substrate and a composition suitable for use in a method according to the invention and containing trichloroacetic acid may be represented thus,

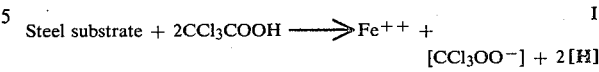

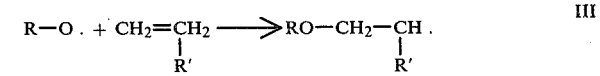

In accordance with the conventional theory of free radical addition polymerization of ethylenically unsaturated compounds, we believe the polymer radical may increase in size by propagation thus:

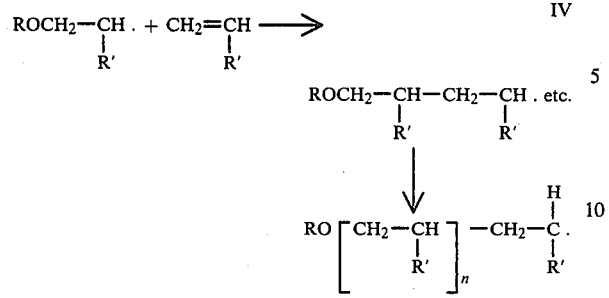

IV

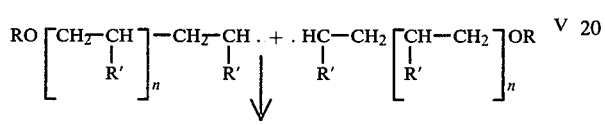

Likewise we believe termination of this chain extension reaction may occur by virtue of combination of two free radicals, for example as follows:

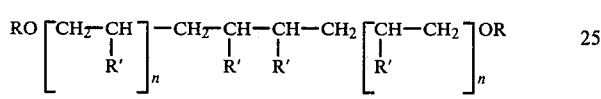

V

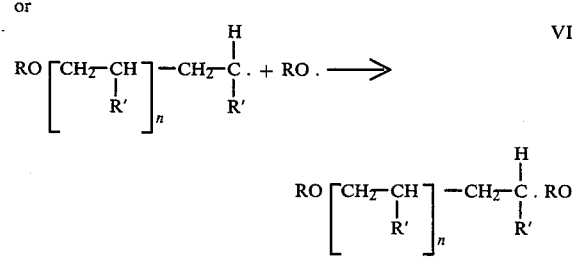

or

VI or by virtue of disproportionation of two free radicals for example as follows:

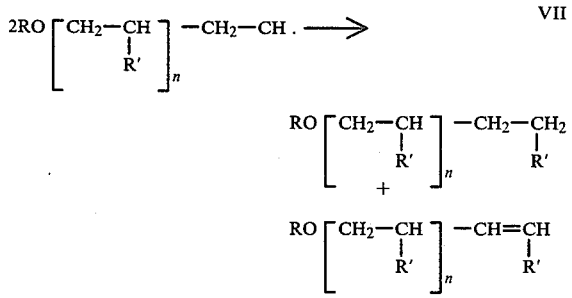

VII

In addition, we believe the selected acids themselves form free radicals which are available to partake in any of the stages represented above at III, IV and VI. For example, a free radical and a terminated polymer chain may be formed from an acid molecule and polymer free radical thus:

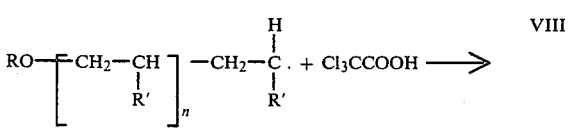

VIII

-continued

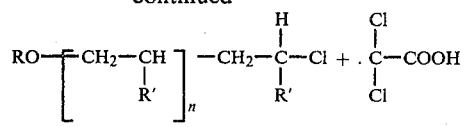

This new free radical may initiate polymer chain formation thus:

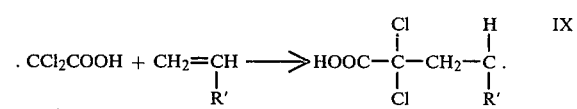

IX or it may terminate a chain to provide an acid terminated polymer thus:

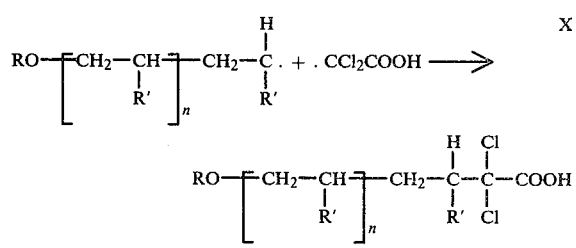

X

We have observed that for a given acrylic monomer, larger quantities of the selected acids tend to lead to faster initiation of polymerization of the monomer. Also, however, larger quantities of the selected acids tend to lead to polymerization products which give weaker adhesive properties. Accordingly, the amount of the selected acids employed is chosen with a view to achieving an acceptable balance between these properties. For example, in our preferred compositions we prefer to use trichloroacetic acid to an extent of from 0.01% to 5% by weight. With the larger quantities of acid, however, weaker bonds may be observed together with some small amount of corrossion. Accordingly we prefer to use no more than about 2% trichloracetic acid by weight of the prepared compositions. While quantities as low as 0.01% by weight are effective, and while there may be some dissipation of the acid during storage it does not appear necessary that more than 0.5 to 1% by weight of the selected acids be present in the composition when used in order to achieve good results.

A variety of peroxides may be employed in an adhesive composition for use in a method according to the present invention. For example, rapid starting of polymerization of a composition according to the invention may be achieved in presence of benzoyl peroxide, 2,5-dimethyl-2,5di(t-butylperoxy)hexane, 1,1 di-t-butylperoxy-3,3,5-trimethylcyclohexane, and dilauryl peroxide. However the choice of peroxide used is important in relation to the storage stability of the single part compositions. Where a fast start to the polymerization is required coupled in lengthy storage stability at 45° C., we prefer to employ 2,5-dimethyl-2,5-di(t-butylperoxy)-hexane. We find it sufficient to employ from 0.3% to 10% by weight of the preferred peroxide by weight of the composition.

One may regard the combination of the selected acid and peroxide as an incomplete "redox" system which is completed by interaction between appropriate metals and the acid to initiate the addition polymerization of the unsaturated monomer. We have found these compositions may be stored and used as single part compounds requiring no additional primer to quickly form bonds on steel, brass, copper and nickel. Their use can be extended to form bonds to chromium, zinc, aluminum and stainless steel by the additional use of reducing agent applied to the metal prior to application of the adhesive composition. Amine derivatives are especially suitable for this purpose, and we prefer to employ an azomethine (i.e. a Schiff's base or arylimide). These may be formed by reaction of an aromatic amine with an aliphatic or aromatic aldehyde or ketone. Preferred materials are the condensation products of aniline and butyraldehyde.

As is common practice in the anaerobic adhesives art, we prefer to package compositions for use in a method according to the present invention in low density polyethylene containers of geometry providing a large specific surface and to ensure that the containers are only partially filled with the composition. In addition to inhibition by action of oxygen, we prefer to include an additional inhibitor of free radical polymerization in order to produce desirably stable compositions. The inhibitor used in the composition is preferably hydroquinone, but may consist of or include for example p-methoxy phenol, catechol, or t-butyl-catechol.

There now follows a description of various Examples of anaerobic adhesive compositions and their use in the method of the present invention. It is to be understood that the invention is not restricted to the particular materials, proportions or procedures of the Examples. Examples, 1, 2, 3, 9, 10, 11, 12, 13, 14 and 15 are exemplary of anaerobic adhesive compositions for use in a method according to the present invention, and Examples 1, 2, 3, 13, 14 and 15 are illustrative of composition aspects of the invention.

The example compositions were made up from a masterbatch formulation as follows:

|  | Parts by Weight |
|---|---|
| Ethylene glycol dimethacrylate | 80.00 |
| 2-hydroxy ethyl acrylate | 10.00 |
| Polymethyl methacrylate | 9.00 |
| Hydroquinone | 0.01 |

The ingredients shown in Tables I, II and III were added to portions of the masterbatch in the quantities (in parts by weight percent of the portion) indicated in the Tables. In Examples 1 to 8, 2% by weight of 2,5-dimethyl-2,5-di(t-butylperoxy)hexane was added to portions of the masterbatch along with various acids as shown in Table I. In Examples 9 to 12, 1% by weight of trichloroacetic acid was added to portions of the masterbatch along with 2% by weight of various peroxides. In Examples 13 to 15, 2% by weight of 2,5-dimethyl-2,5-di(t-butylperoxy)hexane was added to portions of the masterbatch with various quantities of trichloroacetic acid.

Tests were carried out to examine the storage stability of the compositions, the setting time and bond strengths achieved when using the composition as a locking adhesive between steel screws and nuts, and the subsequent corrosion behaviour of the steel so bonded. The results are recorded in Table IV.

To examine storage stability of the example compositions, 50 ml of each composition was placed in a 100 ml low density polyethylene bottle of square cross-section, a cap was screwed onto each bottle and the closed bottles were stored in air at 45° C. The bottles were checked daily for polymerization of the compositions as evidenced by a significant thickening or setting of the composition. Those compositions which remained substantially unchanged after 90 days storage were regarded as likely to be stable for at least one year at 20° C., and therefore regarded as especially acceptable from the storage stability viewpoint.

To examine setting time, bond strength and corrosion effect, sample bonds were made in the following way. A mild streel screw and cooperating nut (denoted as M10 or M12 according to DIN 993 and 934 and recorded in Table IV as * for M10 screws and ** for M12 screws) were dipped in trichlorethylene to clean them, and allowed to dry. A few drops of an example composition, which had been stored for 24 hours after preparation, were applied to the screw to fill the thread clearances, and the nut was immediately threaded on the composition on the screw. The setting time of the example composition is recorded as the time (in minutes) elapsing between threading of the nut onto the screw and the instant at which the nut cannot be moved on its screw by hand twisting, i.e. when the nut is "finger tight". Those compositions which demonstrated a setting time of more than 60 minutes were regarded as unlikely to be of significant practical use as nut locking adhesives, and we prefer to have a setting time of less than twenty minutes on M10 screws.

To examine bond strengths, the sample bonds were stored for 24 hours after preparation and then were subjected to breakage by unscrewing the nuts from the screws. When loosening a nut from a screw, in order to commence relative rotation, one overcomes friction between the threads of the screw and nut. In presence of a nut locking adhesive between the threads, additional force is required to overcome the contribution of the adhesive composition and so commence relative rotation. The force required to losen the nut from the screw is recorded in Table IV as the "Breakaway torque". The force required to continue relative rotation of the screw and nut after one revolution of the nut is recorded in Table IV as the "Prevailing torque". It is noted that the breakaway torque and prevailing torque values given in Table IV are those given after the example composition has been permitted to cure anaerobically for 24 hours. We have found that examination of the values of breakaway torque and prevailing torque measured at intervals over a period of 24 hours from preparation of the sample bonds demonstrate an increase in bond strength to a maximum value after about 15 to 24 hours cure. We have also found that the breakaway and prevailing torque values achieved with a given composition are influenced by the size of the screws used to make the sample bonds, and demonstrate an exponential increase with corresponding increase in screw size. We believe that those example compositions which demonstrate a breakaway torque from 0.5 to 3.5 Kpm or a prevailing torque from 1.5 to 8 Kpm are likely to be most suitable for general use as a nut locking adhesive on various sizes of mild steel screws. Also, where the composition is expected to be used with screws of materials other than mild steel we prefer to employ compositions which exhibit higher breakaway and prevailing torque values when used on steel screws.

Sample bonds were made as just above described, using example composition 1 between nuts and bolts of brass and of nickel, and the breakaway torque and prevailing torque measured for each sample on M12 screws:

|  | Breakaway Torque Kpm | Prevailing Torque Kpm |
|---|---|---|
| Nickel screws | 0.60 to 0.90 | 1.50 to 3.30 |
| Brass screws | 0.20 to 0.30 | 2.50 to 3.30 |

Sample bonds were made as just above described, using example composition 1 between nuts and bolts of chromium plated steel which had been treated with a 20% solution of the condensation product of aniline and crotonaldehyde in acetone:

| Breakaway Torque Kpm | Prevailing Torque Kpm |
|---|---|
| 0.60 to 1.50 | 0.60 to 3.50 |

TABLE I

| Acid type variation | | |
|---|---|---|
|  | Amount | Example Composition No. |
| Trichloroacetic acid | 1% | 1 |
| Dichloroacetic acid | 1% | 2 |
| Tribromoacetic acid | 1% | 3 |
| Trifluoroacetic acid | 1% | 4 |
| Acetic acid | 1.5% | 5 |
| Hydrochloric acid | 1.5% | 6 |
| Sulphuric acid | 1.5% | 7 |
| No acid | — | 8 |

TABLE II

| Peroxide Variation | Example Composition No. |
|---|---|
| Dicumyl peroxide | 9 |
| Benzoyl peroxide | 10 |
| Dilauryl peroxide | 11 |
| 1,1-di-t-butylperoxy-3,3,5-trimethylocyclohexane | 12 |
| Acid Quantity Variations | |
| To the master batch composition 2% of 2,5-dimethyl-2,5-di (t-butylperoxy)-hexane and various quantities of trichloroacetic acid were added. | |

TABLE III

| Quantity of trichloroacetic acid | Example Composition No. |
|---|---|
| 0.1 | 13 |
| 0.25 | 14 |
| 0.5 | 15 |

TABLE IV

| Example Composition | Screw Size | Setting Time (min.) | Breakaway Torque kp.m | Prevail. Torque kp.m | Storage Stability at 45° C. | Corrosion Propagated |
|---|---|---|---|---|---|---|
| 1 | * | 5 | 2 | 5 | >90 days | No |
| 2 | ** | 30 | 10 | 1.7 | >90 days | No |
| 3 | * | 20 | 0.4 | 0.6 | >90 days | No |
| 4 | ** | 11 | 4.5 | 5.5 | >90 days | Yes |
| 5 | ** | No cure | — | — | >90 days | No |
| 6 | ** | 12 | 2 | 2 | — | Yes |
| 7 | ** | 37 | 2 | 2.2 | — | Yes |
| 8 | ** | No cure | — | — | — | No |
| 9 | * | 200 | — | — | >90 days | No |
| 10 | * | 3 | — | — | <1 day | No |
| 11 | * | 19 | — | — | <1 day | No |
| 12 | * | 9 | — | — | <1 day | No |
| 13 | ** | 45 | 1 | 5 | >90 days | No |
| 14 | ** | 25 | 1.5 | 5.5 | >90 days | No |
| 15 | ** | 14 | 2 | 6.5 | >90 days | No |
| 1 | ** | 9 | 3.5 | 8 | >90 days | No |

*M10 Screw (mild steel)
**M12 Screw (mild steel)

To examine corrosion behaviour, sand blasted steel plates were coated with example composition 1 to provide thin layers of the composition. With adhesive layers 3–10 mg/cm² in thickness, no visible discoloration of the steel surface occurred. Adhesive layers thicker than 10 mg/cm² led to a visible discoloration of the metal plate. It was observed that the intensity of discoloration depends on the thickness of the adhesive layer. It was observed that when thus coated on the steel surface, the adhesive composition polymerizes completely (i.e. under non-anaerobic conditions) within 2 to 4 hours to a solid protective film. Subsequently, periodic inspections over a two-month period did not reveal any increase of discoloration. An attempt was made to extract free trichloroacetic acid from the polymeric mass of the coating, but without success.

Having thus described our invention, what we claim as new and desire to secure as Letters Patent of the United States is:

1. A method of bonding metal surfaces by use of an anaerobic adhesive composition consisting essentially of a polymerizable acrylic monomer, an organic peroxide selected from the group consisting of benzoyl peroxide; 2,5 dimethyl-2,5di(t-butylperoxy)hexane; 1,1 di-t-butylperoxy-3,3,5-trimethylcyclohexane; dilauryl peroxide and mixtures of these and an acidic substance characterized in that the acidic substance is a halogenated aliphatic monocarboxylic acid according to the general formula

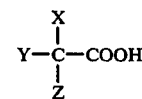

in which
(i) each of X, Y and Z is Cl or Br or
(ii) Z is H or R (where R is a methyl or ethyl group), and each of X and Y is Cl or Br or
(iii) each of Y and Z is H or R and X is Cl.

2. A method according to claim 1 further characterized in that the adhesive composition is applied to an unprimed surface of iron, mild steel, nickel, copper or brass.

3. A method according to claim 1 further characterized in that the adhesive composition is applied to a surface of chromium, zinc, aluminium or stainless steel primed with an axomethine.

4. A method according to claim 1 further characterized in that the polymerizable monomer comprises ethylene glycol dimethacrylate.

5. A method according to claim 1 further characterized in that the acid used comprises trichloroacetic acid.

6. A method according to claim 5 characterized in that the acid is present to an extent of 0.5 to 2.0% by weight of the composition.

7. A method according to claim 1 further characterized in that the adhesive composition is applied to threads of a bolt and a nut is screwed onto the bolt to exclude air from the adhesive composition.

8. A method of bonding metal surfaces by use of an anaerobic adhesive composition consisting essentially of a polymerizable acrylic monomer, an organic peroxide which is 2,5 dimethyl-2,5-di(t-butylperoxy)hexane and an acidic substance characterized in that the acidic substance is a halogenated aliphatic monocarboxylic acid according to the general formula

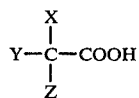

in which
(i) each of X, Y and Z is Cl or Br or
(ii) z is H or R (where R is a methyl or ethyl group), and each of X and Y is Cl or Br or
(iii) each of Y and Z is H or R and X is Cl, and in that the adhesive composition is applied to a clean metal surface which has not been treated with a substituted thiourea primer.

9. A method according to claim 8 further characterized in that the peroxide is present to an extent of 0.3 to 10% by weight of the composition.

10. A method according to claim 9 further characterized in that the adhesive composition is applied to an unprimed surface of iron, mild steel, nickel, copper or brass.

11. A method according to claim 9 further characterized in that the adhesive composition is applied to a surface of chromium, zinc, aluminum or stainless steel primed with an azomethine.

12. A method according to claim 9 further characterized in that the polymerizable monomer comprises ethylene glycol dimethacrylate.

13. A method according to claim 9 further characterized in that the acid used comprises trichloroacetic acid.

14. A method according to claim 13 characterized in that the acid is present to an extent of 0.5 to 2.0% by weight of the composition.

15. A method according to claim 9 further characterized in that the adhesive composition is applied to threads of a bolt and a nut is screwed onto the bolt to exclude air from the adhesive composition.

16. An anaerobic adhesive composition consisting essentially of a polymerizable acrylate monomer, an organic peroxide selected from the group consisting of benzoyl peroxide; 2,5-dimethyl-2,5-di-(t-butylperoxy)-hexane; 1,1-di-t-butylperoxy-3,3,5-trimethylcyclohexane; dilaurylperoxide and mixtures of these and an acidic substance characterized in that the acidic substance is a halogenated aliphatic monocarboxylic acid according to the general formula

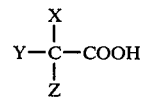

in which
(i) each of X, Y and Z is Cl or Br or
(ii) Z is H or R (where R is a methyl or ethyl group), and each of X and Y is Cl or Br or
(iii) each of Y and Z is H or R and X is Cl.

17. An anaerobic adhesive composition consisting essentially of a polymerizable acrylate monomer of the general formula

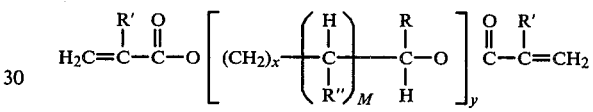

where:
R is $-H$, $-CH_3$, $-C_2H_5$, $-CH_2OH$ or

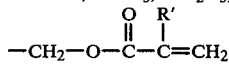

R' is $-H$, $-Cl$, $-CH_3$ or $-C_2H_5$

R'' is $-H$, $-OH$ or 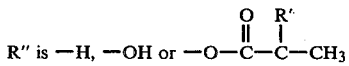

and n is 0 or 1, x is an integer from 1 to 8 and y is an integer from 1 to 20, a peroxide which is 2,5 dimethyl-2,5-di(t-butylperoxy)hexane and an acidic substance selected from the group consisting of trichloroacetic acid, dichloroacetic acid, or tribromoacetic acid.

18. An adhesive composition according to claim 17 wherein the monomer comprises ethylene glycol dimethacrylate.

19. An adhesive composition according to claim 17 comprising 0.5 to 1% by weight trichloroacetic acid on the weight of the composition.

20. An adhesive composition according to claim 17 further characterized by containing monoethylenically unsaturated monomer.

21. An adhesive composition according to claim 17 further characterized by containing materials which influence flow characteristics of the adhesive composition or flexibility characteristics of bonds formed by the adhesive composition.

* * * * *